June 5, 1962
L. G. SIMJIAN
3,038,157
DEPOSIT EXCHANGE MACHINE INCLUDING IMAGE RECORDING MEANS
Filed Feb. 26, 1960
6 Sheets-Sheet 1
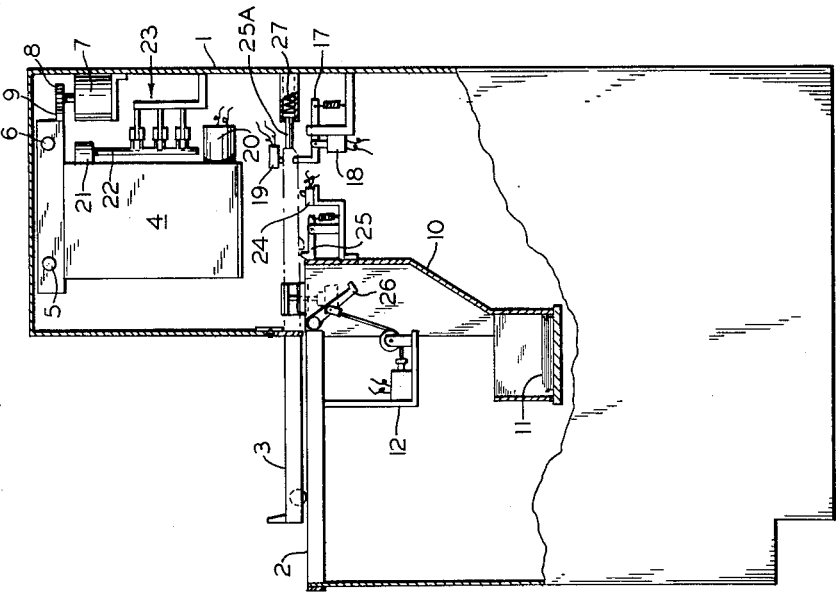
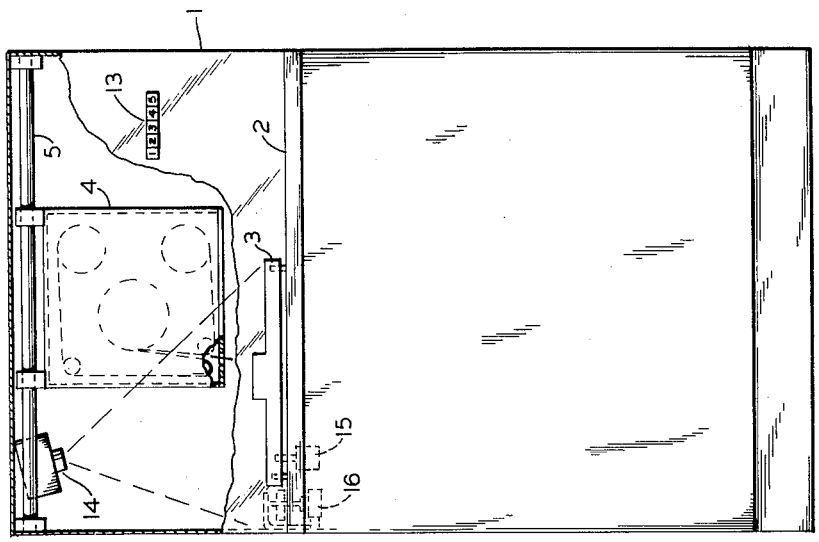
*INVENTOR.*
LUTHER G. SIMJIAN
BY
AGENT.

June 5, 1962 L. G. SIMJIAN 3,038,157
DEPOSIT EXCHANGE MACHINE INCLUDING IMAGE RECORDING MEANS
Filed Feb. 26, 1960 6 Sheets-Sheet 2
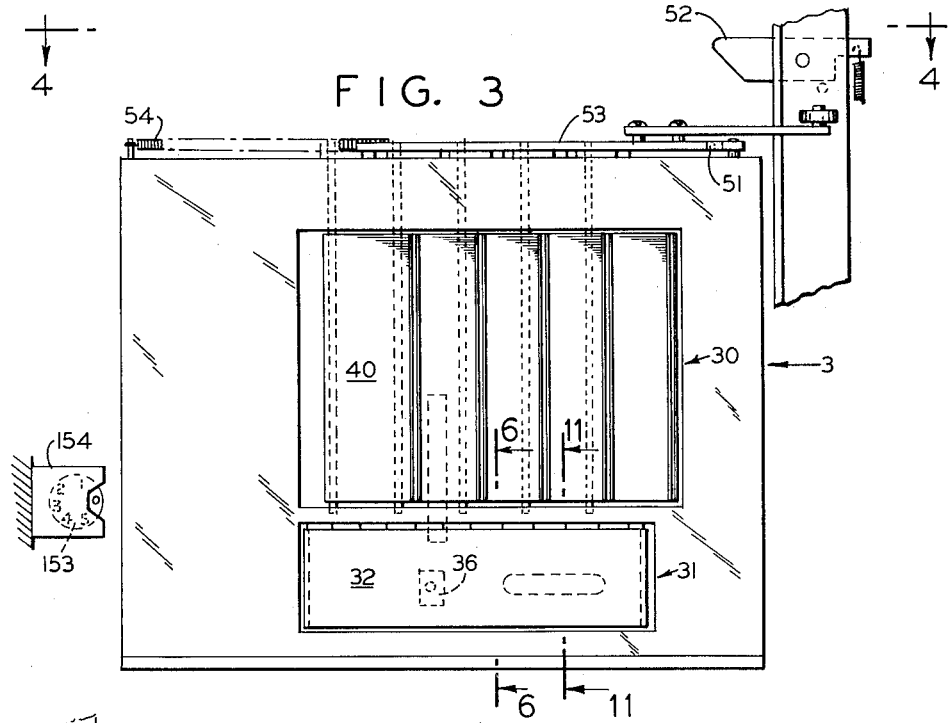
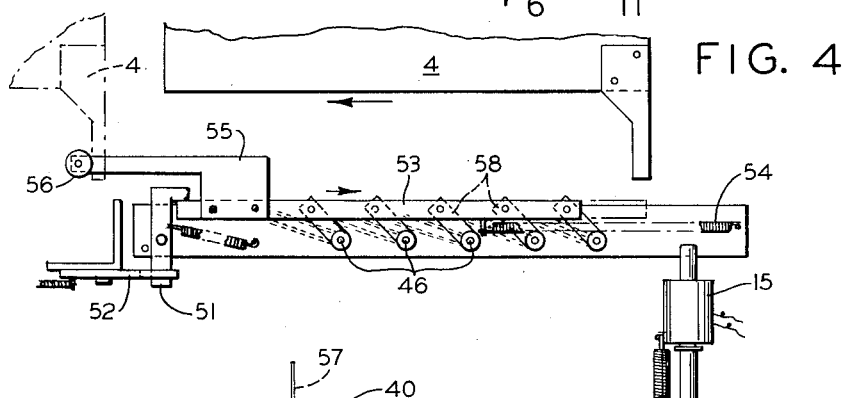
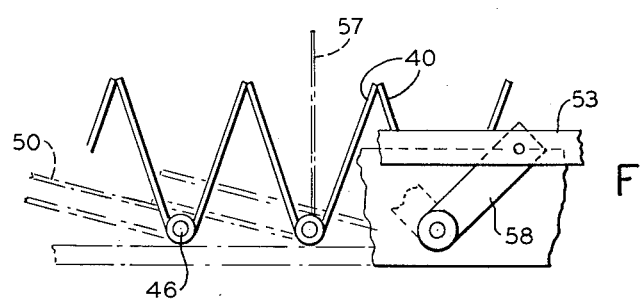
INVENTOR.
LUTHER G. SIMJIAN
BY
Ervin B. Steinberg
AGENT.

June 5, 1962     L. G. SIMJIAN     3,038,157
DEPOSIT EXCHANGE MACHINE INCLUDING IMAGE RECORDING MEANS
Filed Feb. 26, 1960     6 Sheets-Sheet 3
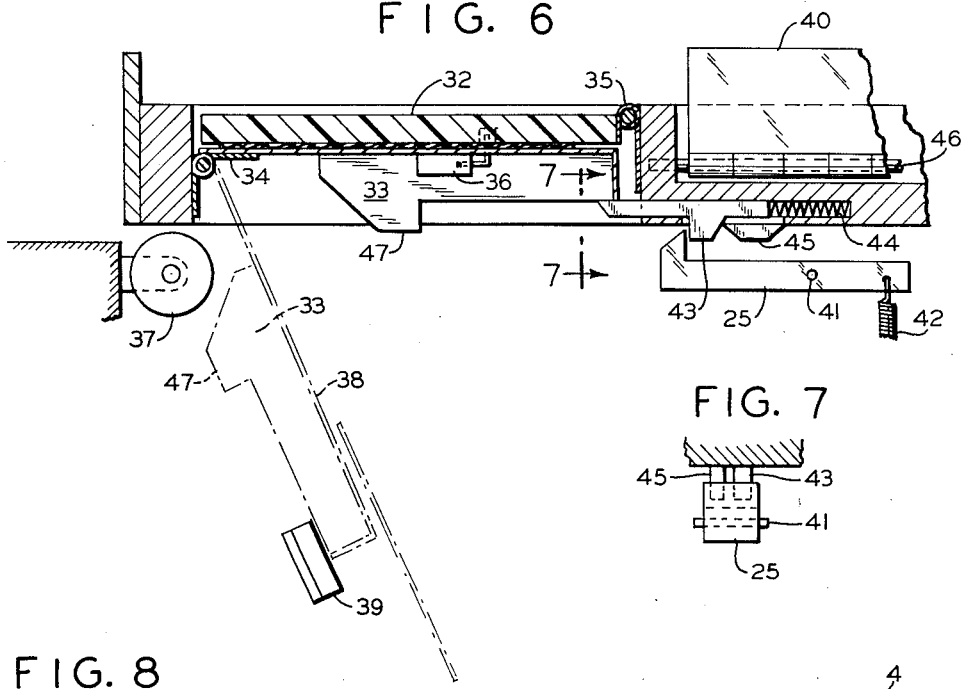
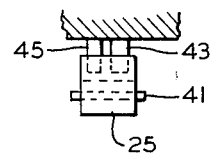
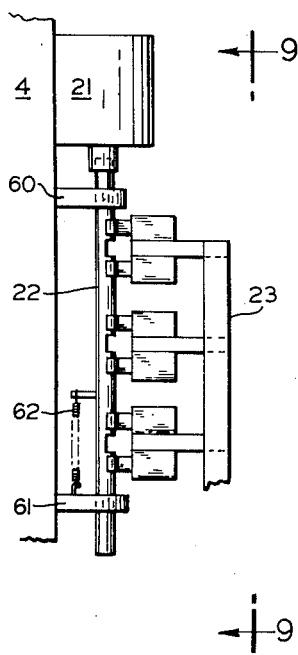
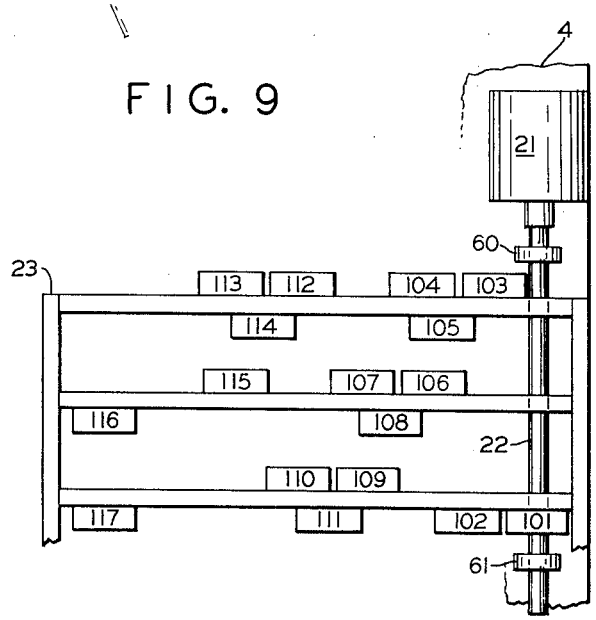
*INVENTOR.*
LUTHER G. SIMJIAN
BY
AGENT.

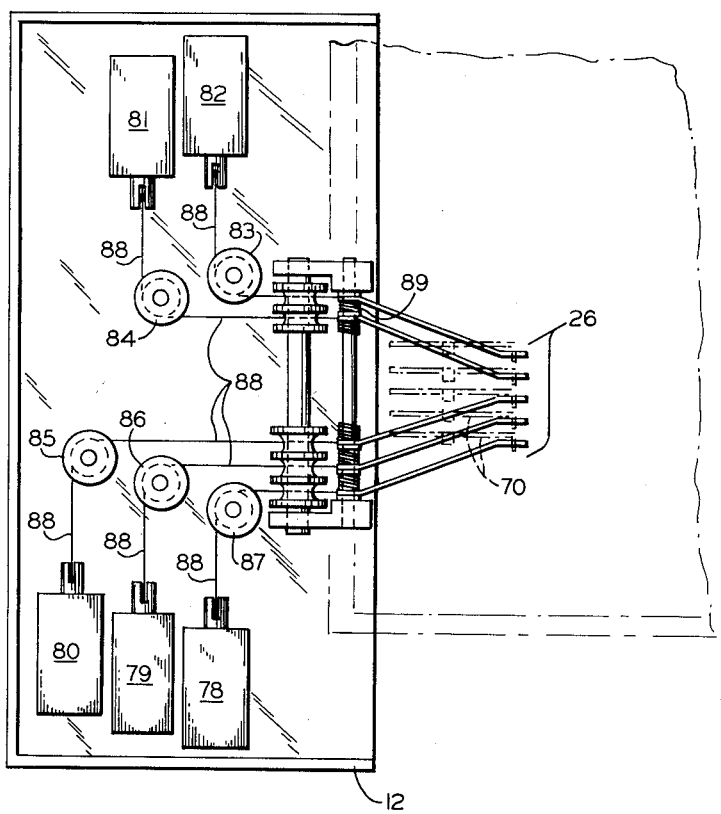
FIG. 10
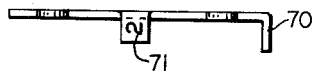
FIG. 12
FIG. 13
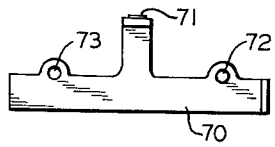
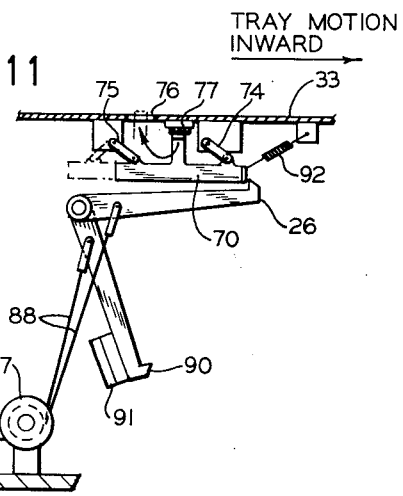
FIG. 11

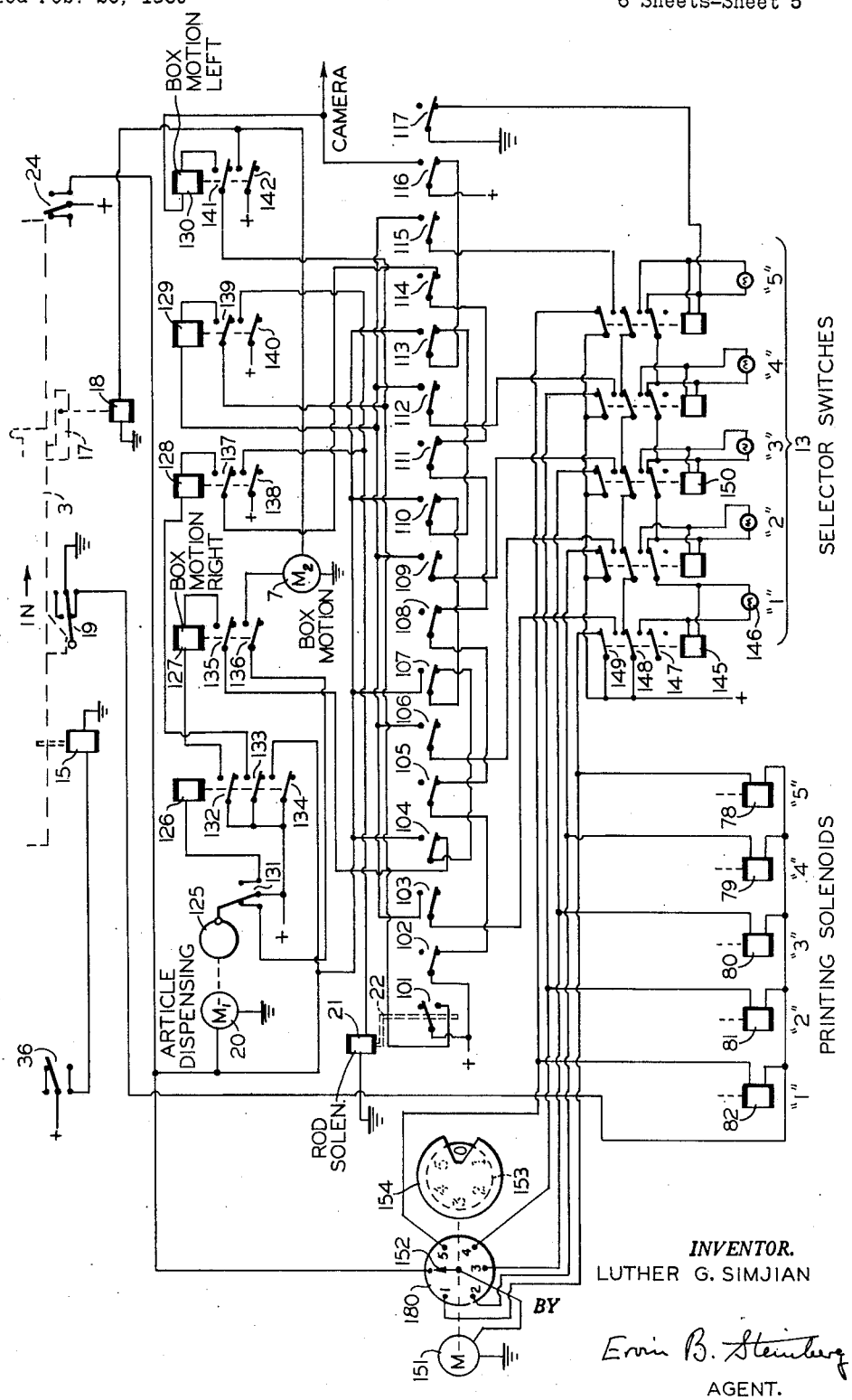

June 5, 1962     L. G. SIMJIAN     3,038,157
DEPOSIT EXCHANGE MACHINE INCLUDING IMAGE RECORDING MEANS
Filed Feb. 26, 1960     6 Sheets-Sheet 6

SELECTOR SWITCHES

*INVENTOR.*
LUTHER G. SIMJIAN
BY
*Ervin B. Steinberg*
AGENT

United States Patent Office 3,038,157
Patented June 5, 1962

3,038,157
DEPOSIT EXCHANGE MACHINE INCLUDING IMAGE RECORDING MEANS
Luther G. Simjian, Greenwich, Conn., assignor to Universal Match Corporation, Ferguson, Mo., a corporation of Delaware
Filed Feb. 26, 1960, Ser. No. 11,186
14 Claims. (Cl. 346—22)

This invention relates to a deposit exchange machine and has particular reference to an apparatus which accepts a deposit and returns in exchange a withdrawal from storage within the machine whereby the withdrawal may be selected to be commensurate in value with that of the deposit.

More particularly, this invention concerns a machine which is usable for cashing checks in predetermined amounts or variable amounts, the value of the withdrawal being selectively adjustable by the person using the machine. The instant machine, therefore, is well suited for operation in banking establishments, in offices and other locations where cashing of checks is performed in the course of business or as a matter of courtesy. In this manner, waiting lines for obtaining small amounts of cash in exchange for the deposit of a check or other document are considerably reduced and an expeditious flow of patrons and customers is achieved. Alternately, the machine may be used to dispense varying kinds or quantities of merchandise.

One of the salient features of the invention concerns the provision of selectively operable means which are settable to positions indicative of the selected withdrawal and the arrangement of indicia means coacting with said operable means for affixing to the deposit indicia which are related to the selected withdrawal. Also, the operation of the operable means causes issuance of a correlated withdrawal.

Another salient feature concerns the provision of means to assure that there is a complete and well-documented record of the transaction. This documentation is achieved by photographic proof in the form of a correlated record of the accepted document, of the withdrawal, and of the indicia which are related to the set position of the selectively operable means and hence, indicative of the value of the withdrawal.

In its simplest embodiment the instant machine comprises an enclosure, and deposit acceptance and withdrawal dispensing means disposed within the enclosure. The dispensing means include selectively operable release means for dispensing variable withdrawals. The deposit acceptance means include an aperture on the enclosure for receiving a deposit from the depositor. Control means are disposed so as to be operable from the exterior of the enclosure and are selectively settable to positions related to the selected withdrawal. The dispensing means release the withdrawal from storage within the machine for issuance to the exterior of the enclosure whereby the withdrawal is responsive to the particular setting of the control means. Indicia affixing means coact with the control means for affixing to the deposit indicia which are indicative of the setting of the control means and hence of the character of the withdrawal. Further control means operate cyclically to effect operation of the deposit acceptance means and of the withdrawal dispensing means respectively.

One of the objects of the invention, therefore, is the provision of a deposit exchange machine suitable for installation in banks, offices, shops, and similar establishments.

Another object of this invention is the provision of a deposit exchange machine which includes selectively settable means for determining the nature and character of the withdrawal and wherein indicia are affixed to the deposit, the indicia being responsive to the setting of the settable means.

Another object of this invention is the provision of a deposit exchange machine combined with image recording means so as to provide complete documentation of the transaction.

Another object of this invention is the provision of a deposit exchange machine which is adapted to accept for deposit a check or other negotiable instrument and dispense in return sums of money.

A further object of this invention is the provision of a deposit exchange machine which includes controls for the depositor so as to permit the selection of a variable amount of withdrawal.

A still further object of this invention is the provision of a deposit exchange machine which includes image recording means for recording an image of the deposit, an image of the withdrawal and an image of data related to the manipulations of the depositor whereby corresponding indicia are affixed also to the deposit, these indicia being related to the manipulations of the depositor.

Further and still other objects of this invention will be apparent by reference to the following description taken in conjunction with the accompanying drawings in which:

FIGURE 1 is a front elevational view of the deposit exchange machine with the front panel partially broken away;

FIGURE 2 is a side elevational view, partly in section, of the machine depicted in FIGURE 1;

FIGURE 3 is a plan view of the deposit acceptance means which is adapted to receive an article or deposit and which serves also to dispense the withdrawal to the user;

FIGURE 4 is a view along lines 4—4 in FIGURE 3;

FIGURE 5 is an enlarged view of certain portions of FIGURE 4;

FIGURE 6 is a sectional view taken along lines 6—6 in FIGURE 3;

FIGURE 7 is a detailed view of the latch mechanism viewed along lines 7—7 in FIGURE 6;

FIGURE 8 is an enlarged view of control switches and solenoid-operated actuator revealed in FIGURE 1;

FIGURE 9 is a view of the physical arrangement of the control switches when viewed along lines 9—9 in FIGURE 8;

FIGURE 10 is a plan view of imprinting means used in the instant machine;

FIGURE 11 is a side elevational view, partly in section of certain portions in FIGURE 10;

FIGURE 12 is a plan view of a typical imprinting means;

FIGURE 13 is a side view of a typical printing means;

FIGURE 14 is a schematic electrical circuit diagram for rendering the machine operative;

Figure 15:
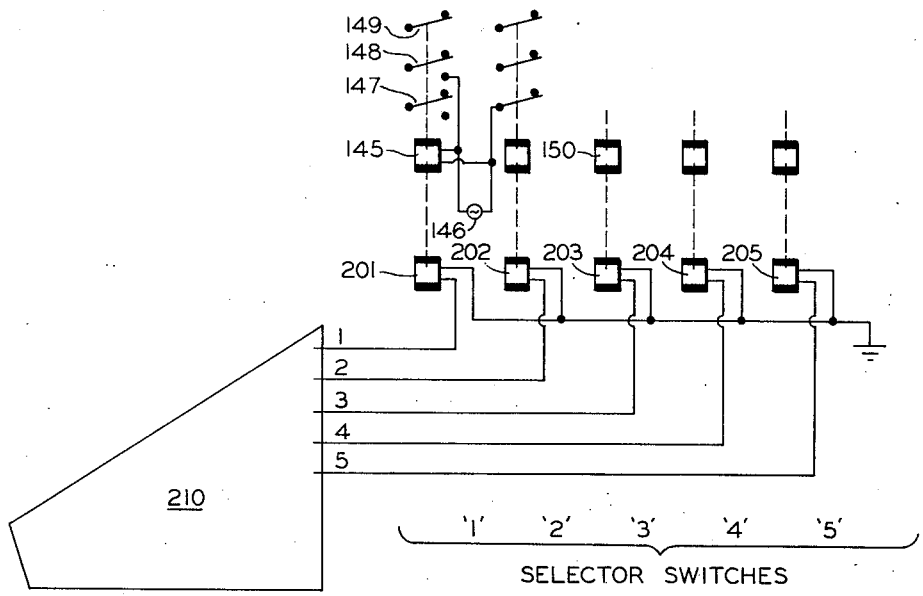
FIGURE 15 is a schematic circuit diagram, partly in block form, showing the circuit modification necessary for including automatic document analyzing means.

Referring now to the figures and FIGURES 1 and 2 in particular, a structural framework with enclosure, numeral 1, encloses and supports the internal mechanisms of the machine. Numeral 2 indicates a shelf which may be used by a depositor as a writing surface and, simultaneously, this surface acts also as a support for a slidable tray 3. This tray in its broadest sense forms the deposit acceptance means which is adapted to receive an article or document for deposit in the machine. By means of rollers and slides the tray is adapted to move in and out of the enclosure, the front of the enclosure being provided of course, with a suitable aperture. Near the top of the enclosure there is mounted a box-like structure, numeral 4, which contains the exchange articles, or in banking terms "the withdrawal." This box-like receptacle is mounted for translating motion along a set of guide bars, numerals 5 and 6. A motor 7, by means of gear 8 and rack 9 attached to the receptacle, causes box 4 to move along the bars, thereby moving laterally relative to tray 3. Also attached to box 4 there is a solenoid 21 which operates a notched rod 22 serving as the actuator for a bank of switches 23 (see also FIGURES 8 and 9). Several of these switches control the translating motion of receptacle 4 as will be described in more detail later. Motor 20 which is attached to receptacle 4 effects dispensing of the exchange article or withdrawal from the receptacle 4 onto tray 3.

When tray 3 is pushed to its rearward position as shown by the dashed line in FIGURE 2, it is engaged by a latch 17 and held in place thereby. Plunger 25A, resiliently biased by a spring 27, is depressed when the tray is latched. When solenoid 18 is energized to release latch 17 from engagement with the tray, plunger 25A moves the tray slightly forward.

During rearward motion, the tray actuates stationary switches 19 and 24, and simultaneously latch 25 engages a bolt which holds a pivotally mounted sub-tray, forming a part of tray 3, in the horizontal position as will be shown more clearly in conjunction with FIGURE 6. Also, while tray 3 moves rearward, a further latch 26 engages an indicia affixing means which will be shown and described in conjunction with FIGURES 10 to 13, inclusive. This indicia affixing means imprints the deposit placed on tray 3 with numerals indicative of the withdrawal or the character of the exchange article dispensed from receptacle 4.

Numeral 10 indicates a chute for receiving and storing the deposit. Accepted checks for instance, are disposed at numeral 11 in a suitable storage receptacle at the end of the chute. The deposit will be removed from this storage position by authorized personnel in the usual manner. An array of selectively operable electrical control switches 13 is mounted to the front panel and thus is exposed to the user of the machine. The operation of the respective control switch determines the character of the withdrawal from box 4 and simultaneously, causes imprinting of the appropriate indicia onto the accepted deposit by means of indicia affixing means. It should be understood by those skilled in the art that the selective operation of control switches 13 may either vary the character of the article dispensed from box 4 onto tray 3 or may vary the quantity of otherwise identical exchange articles. Instead of push-button selector switches, a rotary switch which has various positions may be substituted. An image recording means 14 described hereinafter as a camera, is positioned to take a photograph of the documents or articles resting on tray 3, particularly of the deposit placed thereon by the user and the withdrawal dispensed from box 4 and placed also on the tray. This recording means in its preferred embodiment is an electrically operated camera with automatic film wind up, etc., as is well known in the art. Upon actuation of a suitable switch, an image is taken and the film is automatically advanced. The camera is triggered when the tray 3 is inside the enclosure and at a time when both the deposit and the withdrawal are on tray 3.

A solenoid operated latch 15 mounted to the frame near the front thereof holds the slidable tray in its outward position until a deposit has been placed thereon at which time the deposit, for instance a check, operates a sensing switch to denote the presence of a deposit and renders the machine operative. Numeral 16 identifies a selectively positionable display device displaying indicia indicative of the quantity or character of the withdrawal as controlled by the selective setting of switch array 13. This display, therefore, is correlated with the indicia which are being imprinted onto the deposit itself. The displayed indicia lie within the photographic field so as to be recorded along with the contents of the tray.

FIGURE 3 is a plan view of the tray 3 which includes in general, a front portion 31 extending through the thickness of the tray and a rear portion 30 extending only partially through the tray. Portion 31, the sub-tray previously mentioned, serves as the deposit acceptance means.

Referring also to FIGURE 6, the sub-tray comprises two hinged members, namely, a transparent cover 32 fastened to hinge 35 and a bottom panel 33 fastened to hinge 34. Cover 32, made preferably of Lucite or other non-breakable transparent material, thus is mounted for pivotal motion along its inner lengthwise edge whereas panel 33 is adapted to rotate downward along its forward lengthwise edge and is capable of assuming the dashed position indicated by numeral 38 in FIGURE 6. The downward rotation of this panel is limited by a fixed rest 39.

In operation, the user of the machine raises cover 32 and places a suitable deposit, such as a check, underneath the cover so that the deposit comes to rest between cover 32 and the then horizontally disposed panel 33. The presence of the deposit is sensed by switch 36 whose actuating arm protrudes through a cut-out in the panel as indicated in FIGURES 3 and 6. The tray 3 then is moved inward and the withdrawal or exchange articles are placed on the rear tray portion 30. When the tray is moved outwardly again in order that the depositor gains access to the withdrawal, latch 25 engages bolt 43 and retains the bolt as the tray moves forward. This unlocks panel 33, allowing it to rotate about hinge 34 to assume the rotated position indicated by numeral 38. In this position the deposit, such as the check, falls via chute 10 into the storage receptacle and, therefore, is no longer accessible to the depositor. Ensuing outward motion of the tray causes protuberance 45 to move latch 25 downward, pivoting about pin 41, thus releasing bolt 43 and further movement causes the rotated panel to be raised and returned to its original horizontal position by virtue of extension 47, which forms a part of panel 33 rolling over stationary roller 37. FIGURE 7 shows the relation of latch 25 and bolt 43 with respect to protuberance 45.

Referring now to FIGURES 3 to 5, the rear portion 30 of the tray will be described in greater detail. This portion includes a plurality of parallel aligned and spaced vanes 40, each mounted for pivotal motion about the center of pins 46. These hinged vanes can assume two positions as clearly seen in FIGURE 5, that is, either the upstanding position as shown in solid lines or the folded position as shown by the dashed lines, see numeral 50. When the vanes are in the upstanding position, each two neighboring vanes form a pocket for receiving from the receptacle 4 the exchange article, and in the preferred embodiment, one article per selected pocket. Subsequently, the vanes are rotated and assume the dashed position to retain the withdrawal and also to enable movement of the tray in and out of the front aperture of the enclosure.

When the tray is in the extended position, that is out of the enclosure, the vanes are rotated to their folded position and remain down as the tray is moved inward. When the tray approaches its rear position, latch 51 (FIGURE 3) is released by cam 52, allowing the latch 51 to unlock bar 53. Bar 53 is connected to pins 46 by a plurality of identical short links 58. As spring 54 urges bar 53 to the right, the vanes are rotated and assume the upstanding position so that articles dispensed from box 4 can be dropped into the pocket. Numeral 57 (FIGURE 5) indicates an article falling into one of the pockets. Rotating motion of the vanes is obtained by fastening the set of vanes disposed on one side to pins 46, while the vanes on the other side are hingedly mounted to the respective pins. Thus, as the pins rotate, the vanes fastened thereto rotate therewith and the hingedly mounted vanes follow. In order to dispense articles to the pockets, receptacle 4 moves along bars 5 and 6 toward the left (FIGURE 4) dispensing articles sequentially. Near the end of the travel, an extension on the moving receptacle engages extension 55 and roller 56, both being fastened to bar 53, and further motion to the left of box 4 causes bar 53 to be moved toward the left, thus folding the vanes and causing bar 53 to become latched by resiliently biased latch 51 as shown.

Referring now to FIGURES 8 and 9, solenoid 21 fastened to box 4 has attached to it notched rod 22 which moves axially in guides 60 and 61. Brackets 23 support snap acting switches 101 through 117, inclusive. Each switch, also known as "Microswitch," has a protruding lever which when depressed causes switch actuation. Rod 22 is notched so that when it is in the raised position, certain switches will not be energized. When solenoid 21 is de-energized, the rod returns to its lower position by means of biasing spring 62. The switches are numbered to correspond to the numerals used in the circuit diagram, FIGURE 14. As box 4 moves along bars 5 and 6, notched rod 22 is carried along and in a sequential manner engages stationary switches 101 to 117.

Rod 22 as shown is disposed in its normal position and is capable of operating all switches 101 to 117 during its traversal of the switch array. Depending on the operation of the selector switch array 13, certain switches may, however, remain idle. When solenoid 21 is energized, thus raising the rod, switches 103, 104, 106, 107, 109, 110, 112, 113 and 115 remain de-energized since a respective notch passes the associated switch levers. Switches 103, 106, 109, 112 and 115 are connected respectively to the selector switches on the front panel and effect raising of the notched rod depending upon the selection made at switch array 13. Switches 104, 107, 110 and 113 cause starting of article dispensing motor 20. Switches 102, 105, 108, 111 and 114 are used for maintaining a control relay energized. Switch 101 is used also for control purposes. Switch 116 causes operation of the camera and causes also return of box 4 to its starting position. Switch 117 resets the selector switch array 13.

FIGURES 10 through 13 depict more clearly the indicia imprinting means referred to heretofore in connection with FIGURE 2, numerals 12 and 26. The structure 12 is shown as carrying five solenoids which are numbered, respectively, 78, 79, 80, 81 and 82. Each solenoid has attached to its plunger a flexible cord 88 which is fed about a respective roller 83 through 87. The other end of each cord is attached to one of the five latches 26 as shown clearly in FIGURE 11. The number of printing bars in the instant example equals the number of selectively operable push buttons on the front panel so that there is one bar for each push button.

The latches are biased in their upward direction by means of torsion springs 89 disposed about an associated shaft whose center acts as pivotal axis for the latches. Each of the latches is urged into downward motion when the associated solenoid is energized causing it to exert pull on the flexible cord attached thereto.

FIGURES 12 and 13 show a plan and side view, respectively, of the printing bar 70, one such bar being associated with each latch mechanism. Each printing bar consists of a flat base with bent tabs as shown, particularly tab 71 containing on its upper surface an embossed indicium, for instance numeral "2." The embossed printing surface may be rubber or steel as is well known in the art of indicia affixing means. The printing bar is equipped also with two pivotal holes 72 and 73 on either side of the imprinting means.

Referring to FIGURE 11, printing bar 70 is hingedly supported on the underside of panel 33 by means of two swinging links 74 and 75 and is biased toward the right by tension spring 92. In this position, printing tab 71 is held in contact with an inking pad 77.

As will be apparent from the description of the circuit diagram, when a certain number is selected by operation of switch assembly 13 on the front panel, FIGURE 1, all but one of the solenoids 78 through 82 are energized, thus pulling down all but one of the latches 26 as the tray is pushed to its inward position. This pulled down position of certain latches is shown by numeral 90 where the latches so rotated are depicted as being stopped by fixed rest 91. The one remaining latch 26 which is identified with the indicia corresponding to the number selected at switch assembly 13, engages associated bar 70 and arrests motion thereof as tray 3 is pushed inward (to the right). Bar 70 then swings about links 74 and 75 so that the indicia printing means 71 emerges through aperture 76 in the panel, thereby causing the printing bar 70 to affix indicia to the deposit.

As dispensing means 4 reaches its extreme right hand position and after having dispensed its final exchange article, a switch actuates camera 14 to take a photograph of the tray before the tray is allowed to be drawn outwardly from the machine. Also shown in FIGURE 3 is an indicia display wheel which contains numerals correlated with the switch array on the front panel and by means of suitable control means, the visible indicia on this display coincide with the selected switch and hence, correspond also with the indicia imprinted on the underside of the deposit.

The dispensing means, box 4, in the present embodiment comprises a receptacle as disclosed and described in my copending application for U.S. Letters Patent, Serial No. 835,765, filed August 24, 1959, entitled "Receptacle for Depository Apparatus or the Like," now Patent No. 2,981,492, issued April 25, 1961. The receptacle is a rectangular structure with a set of rollers and a pair of juxtaposed tapes therein. Articles are confined between the pair of tapes and as the tapes are driven past the dispensing aperture and folded back, articles are sequentially released from engagement with the tapes and are free to fall out of the receptacle. By loading the tapes with a series of single articles or money bills as indicated heretofore, such bills are dispensed in sequence, the quantity of dispensed bills depending upon the duration of actuation of motor 20.

The over-all interrelation of the various mechanisms will be more clearly understood by reference to the following description which omits some of the mechanical details already described.

Let it be assumed that a check in the sum of $30.00 is placed by a depositor on the tray underneath the transparent cover 32. The presence of such a document actuates switch 36. Operation of the document sensing switch in turn releases the locking device associated with solenoid 15 so that tray may be moved inward. Next, the depositor operates one of the push-button switches 13 on the front panel, in this instance, the button identified "3" denoting $30.00. In response to the operation of push-button switches 13 all printing bars except number 3 become disabled, and while tray 3 is moved toward the rear, the number 3 printing bar is contacted by latch 26 thus causing the underside of the check to be imprinted with "3." Moreover, the display means 154 is rotated so that wheel 153 displays numeral "3" to the camera. As the tray is moved all the way into the enclosure and approaches its end position, latch 17, FIGURE 2, is engaged and holds the tray locked. When the tray is held in the full inward position, vanes 40 previously being in their down position have become released by means of cam 52 acting on latch 51 so that the vanes now are upstanding and form pockets. Next, receptacle 4 begins to dispense the proper quantity of exchange articles onto the tray, in this case depositing one $10.00 bill in the open portion of the vanes until a total of three bills has been dispensed. When the dispensing means 4 has reached the last pocket and continues, the vanes are folded again and as box 4 travels to the extreme right position, the camera is actuated to photograph the tray and index wheel. In this manner there will be taken a photograph of the deposit (check), of the withdrawal (three ten dollar bills), and of the indicia associated with the amount of the withdrawal, all images being correlated with one another.

During the ensuing period, latch 17 is released by actuation of solenoid 18 whereupon spring 27 and plunger 25A move the tray slightly out of the enclosure. As the tray is manually pulled out of the enclosure, panel 33 of the sub-tray pivots downward to deposit the check in chute 10 and subsequently is rotated upward again as the tray continues along its outward motion. When the tray is fully extended, the depositor removes the withdrawal from the pockets, and the tray remains locked in the outward position by virtue of the locking mechanism associated with solenoid 15.

*Circuit Diagram*

Referring to FIG. 14, the circuit diagram, switch 24 is actuated by the inward motion of tray 3. It is a switch which is energized in one direction only, that is, it is responsive only to the inward motion of the tray but does not respond to outward motion of the tray. Inward motion of the tray energizes the switch long enough for the motor 20 to start rotation. The array of selectively operable switches, solenoids and lights 13, corresponds to the group shown on the front panel in FIGURE 1. The switches are commercial type push-button switches with lighted panel. The action of one switch will be described which operation will suffice for the others in this group. When the selected push button is depressed, all three associated contacts, numbers 147, 148 and 149 are actuated and solenoid 145 is locked for holding the contacts in the actuated position as well as causing energizing lamp 146 to show that this switch is actuated. Switches 101 to 117 inclusive are control switches traversed by notched rod 22. These switches bear the same reference numerals as shown in FIGURE 9.

As a means of explaining the circuit diagram and in line with the previous explanation it may be assumed that a check in the amount of thirty dollars is to be cashed. The check is placed underneath cover 32 thereby causing operation of switch 36 and in turn effects unlocking of the tray. Next, the push button marked "3" in the array 13 on the front panel is depressed. This switch is associated with solenoid 150 on the circuit diagram. As the tray is pushed in and reaches its inward position, switch 19 is operated and simultaneously latch 17 locks the tray and, further, switch 24 is operated momentarily. Switch 24 starts motor 20 and by means of wafer switch 180 and wiper arm 152, motor 151 is also started. Remembering that the switch associated with the digit 3 or 30 (or solenoid 150 on the circuit diagram) has been depressed, motor 151 will revolve until it reaches number 3 index. In this position index number "3" on wheel 153 will be visible in the cut-out of the indicia display means 154 and will remain there until it is reset after photography.

When motor 20 starts to revolve, its associated cam 125 and switch 131 energize relay 126. Cam 125 allows the motor to run for one full revolution of the cam. While the cam completes one revolution dispensing box 4 places one withdrawal article in a pocket on tray 3, specifically, the pocket which at this moment is disposed underneath the article dispensing aperture. When relay 126 is actuated, its associated contacts 132 and 133 operate relays 127 and 128 respectively, and contact 134 keeps motor 20 energized. When cam 125 has completed one revolution, relay 126 drops out thus stopping motor 20. Relay 127 remains locked through associated contact 135 and switch 104, the latter being connected in series with switches 107, 110, 113 and 116, all switches occupying the position shown in FIGURE 14. Relay 128 remains locked through its associated contact 137 and switch 114, the latter being connected in series with switches 111, 108, 105 and 102. Contact 138 of relay 128 energizes solenoid 21 for lifting notched rod 22. As soon as switch 131 is returned to its normal position after the cam has completed one revolution, a voltage is applied to motor 7 via contact 136 of relay 127 and operation of this motor causes box 4 to travel to the right, FIGURE 1, the box carrying along notched rod 22. As the notched rod engages switch 102, this switch is actuated which in turn de-energizes relay 128 and through contact 138 de-energizes solenoid 21, allowing rod 22 to return to its normal position. Further motion of box 4 energizes switch 103 by contact with rod 22, but in this case there is no signal present on switch 103 from its associated front panel switch "1" and the box continues its travel until rod 22 actuates switch 104.

Switch 104 de-energizes relay 127, thus stopping motor 7 and at the same time re-energizes motor 20 to eject another bill onto the tray which at this time has the second pocket disposed underneath the box. The purpose of relay 128 operating as soon as motor 20 has started and thus energizing solenoid 21 which in turn pulls the notched bar 22 upward allowing switch 104 to return to normal is now apparent since in the absence of relay 128, motor 20 would remain running and dispense additional exchange articles into the same pocket.

Again, as switch 131 is returned to its normal position after the second article has been dispensed, motor 7 is again energized, causing box 4 to advance. Rod 22 soon thereafter actuates switch 105 causing drop-out of relay 128 which returns solenoid 21 and notched rod 22 to its normal position. Switches 106, 107 and 108 duplicate the action of switches 103, 104 and 105, respectively. After the third bill has been ejected, the box motion continues to the right and switch 109 is reached. This switch is connected to the array associated with the index number "3" and solenoid 150 respectively. As a result thereof, voltage is present at switch 109 and when it is operated, the voltage causes relay 129 to operate and lock through associated contact 139 and switch 101. Relay 129 through its associated contact 140 also operates solenoid 21. Notched bar 22 is now held upward and subsequent switches that would otherwise operate motor 20 will not be energized. Since switches 110 and 113 remain de-energized, relay 127 is not de-energized with the result that motor 7 continues to drive the box all the way to the right-hand side.

The box finally reaches switch 116 to operate the camera and relay 130, the latter becoming locked through its associated contact 141 and switch 101. Operation of switch 116 also stops further advance of box 4 toward the right by de-energizing relay 127. Switch 117 causes switch array 13 to be returned to its non-actuated position. Relay 130 through associated contact 142 energizes solenoid 18 which releases latch 17, causing the tray to move outward slightly under the influence of plunger 25 and at the same time restarts motor 7 in the opposite direction to return box 4. As the contact associated with selector switch 150 returned to normal, a voltage was applied to point "3" on the wafer switch 180 causing motor 151 to start rotating until the zero position is reached. This position now has no voltage, thus the switch is reset. Box 4 will travel to the extreme left position until rod 22 operates switch 101. This switch causes de-energizing of both relays 129 and 130, stopping motor 7 and de-energizing solenoid 21.

When at the beginning of the cycle, the contact associated with actuated selector switch 150 removed the voltage from point "3," on wafer switch 180, it removed also the voltage from solenoid 80 which is associated with the indicia imprinting means, number 3. Since as has been previously mentioned, this causes the latch associated with this indicium to remain in the raised position, printing bar 70 carrying indicium "3" imprinted the underside of the check as the tray was moved inward.

This completes the description of the circuit diagram.

Although the above description shows and describes a typical and what may be termed, preferred embodiment, it will be apparent that several modifications and variations can be accomplished.

Instead of the withdrawal dispensing means, box 4, other feeding mechanism may be substituted, particularly an article-dispensing device manufactured by Pitney-Bowes, Inc., Stamford, Connecticut, known as "Tickometer." This latter device can be preset to feed a certain number of articles. The control for the feeding mechanism readily can be connected to the selector switch array on the front panel. Alternately, instead of a single dispensing receptacle, a plurality of receptacles may be provided. When this plurality contains identical articles, depending upon the number of dispensing means actuated, variable amounts of otherwise identical withdrawals are obtained. In the event that each receptacle in this plurality contains a different type of article, the nature or character of the dispensed exchange article may be varied so that different articles of merchandise, for instance, are dispensed. Again, this plurality of dispensing receptacles can be interconnected with the selectively actuated push buttons on the front panel in order to properly control the dispensing of the withdrawal.

Instead of providing a separate indicia display which is indicative and related to the selected push-button switch and to the indicia imprinted on the deposit, the underside of the deposit can be photographed after indicia have been affixed thereto. The photographing of both sides of a document is well known in the art of microfilming and does not need to be described in detail. In general, it involves the arrangement of suitable mirrors to deflect an image from the underside of the document to the camera lens. In a further arrangement, the indicia printing means may be connected also to canceling or other printing means to imprint suitable additional notations on the document.

As another variation, the setting of the push-button control switches may be recorded by the camera, an arrangement which is accomplished quite readily either by repeating the setting of the front panel switches at the inside of the enclosure or by having the camera view the selective switch arrangement itself. In this manner, a record is rendered concerning the setting effected by the depositor using the machine.

In order to obtain a continuous count of the amount or value of the deposits or withdrawals, respectively, totalizing means can be connected to the selective push-button array or to the dispensing mechanism of box 4. In this manner, a totalized record is available showing instantly the deposits or withdrawals from the machine. The totalizing means may be made to be resettable to initial positions manually or automatically at the end of a business day or whenever the machine is emptied or loaded. Depending upon whether the deposits or withdrawals are totalized, the counters associated with such totalizing means are ascending or descending.

When it is desired that the apparatus cashes checks which involve the return of coin money, a change-making machine can advantageously be provided inside the enclosure with control buttons on the front panel. Commerical change-making machines are well known from use in restaurants, ticket offices and banks where any combination of coin money is dispensed in response to the operation of suitable keys on a keyboard. The coin money may be dispensed onto the tray so that, if desired, a record provided by the camera is available. Obviously, the control keys for this change-making machine can be connected to the indicia printing means, suitably modified to accommodate additional indicia.

In the event that the deposit is a preprinted check or other standardized document, the instant machine may be provided with automatic analyzing means which read the document and analyze the value of the desired withdrawal. Devices capable of optically reading printed matter, perforated cards, or analyzing magnetic ink characters are well known in the art, having been described, for instance, in the U.S. Patent No. 2,924,380, to F. M. Demer et al., dated February 9, 1960; No. 2,897,481, to D. H. Shepard, issued July 28, 1959; No. 2,894,247 to M. J. Relis, issued July 7, 1959; No. 2,827,822 to R. L. Timms, issued March 25, 1958; No. 2,924,812 to P. E. Merritt, issued February 9, 1960, and many others.

Figure 16:
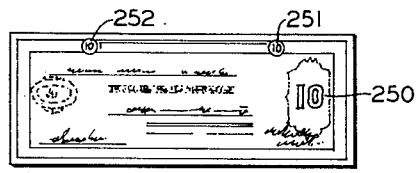
FIGURE 16 is a plan view of a typical document suitable for analysis by an analyzing means.

FIGURES 15 and 16 illustrate the inclusion of the analyzing means in a more detailed fashion. FIGURE 16 is a plan view of a typical preprinted document, such as a traveler check which carries preprinted indicia indicative of the value of the document. Most commonly employed traveler checks having a value of $10.00, exhibit a large printed "10," reference numeral 250, near the right border of the document. On some checks, the value of the document is printed additionally near the top of the check, numerals 251 and 252. Likewise, a $20.00 traveler check has imprinted numeral "20" in the respective place or places. A similar arrangement holds true for documents such as money bills. In other traveler checks there is provided as part of the serial number a letter which is indicative of the denomination of the document. By providing a document analyzing means which views the deposit as the document is moved on tray 3 into the enclosure, it will be possible to determine the value of the document and consequently control the dispensing mechanism in such a way that the withdrawal is commensurate in value.

Each of the push button switches in the array 13, FIGURE 1, whose circuit connections are apparent in FIGURE 14 (solenoids 145, 150, etc.) is equipped with an additional solenoid which upon being energized effects closing of the respective switch contacts. Upon actuation of the respective contact, the previously existing holding solenoids 145, 150, etc., take over. In other words, each of the push button switches is provided with an additional actuating solenoid so that this latter solenoid performs the function otherwise accomplished by a depositor manually depressing the respective push button. As shown in FIGURE 15, solenoids 201, 202, 203, 204, and 205 are associated with the respective selector switches shown in FIGURE 14. Reference numeral 210 refers to an automatic analyzing or reading means, in this instance, the block portrays the output selector circuit shown in FIGURE 8 of U.S. Patent 2,897,481 supra. In substantially all reading devices there is provided a plurality of conductors selectively energized for conducting a pulse signal which is indicative of the character read. In the instant circuit, the zero signal line remains open since it is not useful for the circuit per FIGURE 14. However, output signals appearing along signal lines 1 through 5 are connected to the respective pull-in solenoids so that when a $10.00 check is read, the analyzing means provides an electrical signal in the "1" line which signal causes momentary actuation of solenoid 201. Reading of "3" signal causes momentary energizing of solenoid 203. Since these solenoids have the same effect as manual actuation of the selector switch described previously, the ensuing cycle of operation is identical with the description hereinbefore.

In a similar way, the instant apparatus may be modified to be operable only by means of a subscriber identifying means or credit card. A typical device of this type serving as an attachment to dispensing machines has been described, for instance, in my copending application for U.S. Letters Patent, Serial No. 838,881, filed September 9, 1959, entitled "Subscriber Controlled Apparatus." In this referenced application, a subscriber is provided with a coded identifying means whose validity is sensed for the prevailing period of time and which means, moreover, restricts a subscriber to a single use within a predetermined time interval. If the identifying means fails to be of proper validity, the apparatus remains locked.

A further modification which may be incorporated without changing the intent and principle of the present invention concerns the substitution of a sequential feeding mechanism to cooperate with tray 3. Such mechanisms are well known in the art of microfilming and include the provision for feeding documents sequentially from a stack into the machine. The articles then are photographed as they pass in view of the camera. Instead of showing on a single frame, the deposit and withdrawal, such data will be contained on sequential frames of the photographic film whereby the beginning and end of a transaction can be noted on the film by mechanical or optical recording means.

While there has been described a certain preferred embodiment of the present invention together with various alternate arrangements and accessory equipment, it will be apparent to those skilled in the art that further modifications and changes may be made therein without deviating from the principle and intent of the present invention which shall be limited only by the scope of the appended claims.

What is claimed is:

1. In a deposit exchange machine including deposit storage means of the type described, the combination of: an enclosure; deposit acceptance means and withdrawal dispensing means contained in the enclosure; said dispensing means including selectively operable release means for dispensing variable withdrawals; said deposit acceptance means including an aperture on said enclosure for receiving a document type deposit; document analyzing means adapted to coact with said deposit acceptance means for analyzing said deposit and providing an output which is responsive to data on said deposit; said output coupled to said selectively operable release means for releasing a withdrawal from storage within the machine to the exterior of the enclosure whereby the withdrawal is responsive to the output from said analyzing means; indicia affixing means disposed in said enclosure for affixing to the deposit indicia which are responsive to the output from the analyzing means and hence indicative of the released withdrawal; image recording means disposed to view and record an image of said deposit and of said withdrawal in correlatable relationship; control means for cyclically operating said deposit analyzing means, indicia affixing means, withdrawal dispensing means and recording means respectively, in response to the acceptance of the deposit, and means for transferring said deposit subsequent to the operation of said indicia and image recording means to said storage means.

2. In a deposit exchange machine of the type described, the combination of: an enclosure; deposit acceptance means and withdrawal dispensing means contained in the enclosure; said dispensing means including selectively operable release means for dispensing variable withdrawal; said deposit acceptance means including an aperture on said enclosure for receiving a document type deposit; control means disposed to be operable from the exterior of the enclosure and being selectively settable to positions related to the select withdrawal; said dispensing means releasing the withdrawal from storage within the machine for issuance to the exterior of the enclosure whereby the withdrawal is responsive to the setting of said control means; indicia affixing means coacting with said control means for affixing to the deposit indicia which are indicative of the setting of the control means and hence of the character of the withdrawal; image recording means disposed to view and record an image of said deposit when received by said aperture, and further control means for cyclically operating said deposit acceptance means, withdrawal dispensing means and image recording means.

3. In a deposit exchange machine of the type described, the combination of: an enclosure; deposit acceptance means and withdrawal dispensing means contained in the enclosure; said dispensing means including selectively operable release means for dispensing variable withdrawals; said deposit acceptance means including an aperture on said enclosure for receiving a document type deposit; control means disposed to be operable from the exterior of the enclosure and being selectively settable to positions related to the selected withdrawal; said dispensing means reelasing the withdrawal from storage within the machine for issuance to the exterior of the enclosure whereby the withdrawal is responsive to the setting of said control means; indicia affixing means coacting with said control means for affixing to the deposit indicia which are indicative of the setting of the control means and hence of the character of the withdrawal; image recording means disposed to view and record an image of said released withdrawal prior to its issuance to a position exterior of the enclosure; and further control means for cyclically operating said deposit acceptance means, withdrawal dispensing means and image recording means.

4. In a deposit exchange machine of the type described, the combination of: an enclosure; deposit acceptance means and withdrawal dispensing means contained in the enclosure; said dispensing means including selectively operable release means for dispensing variable withdrawals; said deposit acceptance means including an aperture on said enclosure for receiving a document type deposit; control means disposed to be operable from the exterior of the enclosure and being selectively settable to positions related to the selected withdrawal; said dispensing means releasing the withdrawal from storage within the machine for issuance to the exterior of the enclosure whereby the withdrawal is responsive to the setting of said control means; indicia affixing means coacting with said control means for affixing to the deposit indicia which are indicative of the setting of the control means and hence of the character of the withdrawal; image recording means disposed to view and record an image of said deposit and of said released withdrawal in identifiable relationship with respect to one another; and further control means for cyclically operating said deposit acceptance means, withdrawal dispensing means and image recording means.

5. In a deposit exchange machine of the type described, the combination of: an enclosure; deposit acceptance means and withdrawal dispensing means contained in the enclosure; said dispensing means including selectively operable release means for dispensing varying kinds of withdrawals; said deposit acceptance means including an aperture on said enclosure for receiving a document type deposit; control means disposed to be operable from the exterior of the enclosure and being selectively settable to positions related to the selected withdrawal; said dispensing means releasing the withdrawal from storage within the machine for issuance to the exterior of the enclosure in response to the acceptance of the deposit whereby the kind of the withdrawal is responsive to the setting of said control means; indicia affixing means disposed on said machine and adapted to engage the deposit for affixing to the deposit indicia which are indicative of the setting of the control means and hence of the kind of the withdrawal; image recording means disposed to view and record an image of said deposit and of said released withdrawal in identifiable relationship with respect to one another, and further control means for cyclically operating said deposit acceptance means, withdrawal dispensing means and image recording means.

6. In a deposit exchange machine of the type described, the combination of: an enclosure; document acceptance means and withdrawal dispensing means contained in the enclosure; said dispensing means including selectively operable release means for dispensing withdrawals of variable amounts; said document acceptance means including an aperture on said enclosure for receiving a document; control means disposed to be operable from the exterior of the enclosure and being selectively settable to positions related to the amount of the withdrawal; said dispensing means releasing the selected withdrawal from storage within the machine for issuance to the exterior of the enclosure whereby the withdrawal is responsive to the setting of said control means; indicia affixing means coacting with said control means for affixing to the document indicia which are indicative of the setting of the control means and hence of the amount of the withdrawal; image recording means disposed to view and record an image of said document and of said released withdrawal in identifiable relationship with respect to one another, and further control means for cyclically operating said document acceptance means, withdrawal dispensing means and image recording means.

7. In a deposit exchange machine of the type described the combination of: an enclosure; document acceptance means and withdrawal dispensing means contained in the enclosure; said dispensing means including selectively operable release means for dispensing withdrawals of variable amounts; said document acceptance means including an aperture on said enclosure for receiving a document; control means disposed to be operable from the exterior of the enclosure and being selectively settable to positions related to the amount of the withdrawal; said dispensing means releasing the selected withdrawal from storage within the machine for issuance to the exterior of the enclosure whereby the withdrawal is responsive to the setting of said control means; indicia affixing means coacting with said control means for affixing to the document indicia which are indicative of the setting of the control means and hence of the amount of the withdrawal; indicia display means coacting with said control means for displaying indicia indicative of the setting of the control means and hence of the indicia affixed to the document; image recording means disposed to view and record an image of said document, of said released withdrawal and of the indicia displayed in identifiable relationship with respect to one another, and further control means for cyclically operating said document acceptance means, withdrawal dispensing means, and image recording means.

8. In a deposit exchange machine of the type described and as set forth in claim 7 wherein said indicia display means displays indicia which are substantially identical to the indicia affixed to the document.

9. In a deposit exchange machine of the type described and as set forth in claim 7 wherein the image of said document, the image of said withdrawal, and the image of said indicia display are placed on a single frame of a photographic medium.

10. In a deposit exchange machine of the type described the combination of: an enclosure; document acceptance means and withdrawal dispensing means contained in the enclosure; said dispensing means including selectively operable release means for dispensing withdrawals of varying value; said document acceptance means including an aperture on said enclosure for receiving a document; sensing means disposed for sensing the presence of a document and for rendering the machine operative in response to the receipt of the document; control means disposed to be operable from the exterior of the enclosure and being selectively settable to positions related to the value of the withdrawal; said dispensing means releasing the selected withdrawal from storage within the machine for issuance to the exterior of the enclosure whereby the value of the withdrawal is responsive to the setting of said control means; indicia affixing means coacting with said control means for affixing to the document indicia which are indicative of the setting of the control means and hence of the value of the withdrawal; indicia display means coacting with said control means for displaying indicia indicative of the setting of the control means and hence of the indicia affixed to the document; image recording means disposed to view and record an image of said document, of said released withdrawal and of the indicia displayed in identifiable relationship with respect to one another, and further control means interconnected with said sensing means for cyclically operating said document acceptance means, withdrawal dispensing means, and image recording means.

11. In a deposit exchange machine of the type described the combination of: an enclosure; document acceptance means and withdrawal dispensing means contained in the enclosure; said dispensing means including selectively operable release means for dispensing withdrawals of varying value; said document acceptance means including an aperture on said enclosure for receiving a document; sensing means disposed for sensing the presence of a document and for rendering the machine operative in response to the receipt of the document; control means disposed to be operable from the exterior of the enclosure and being selectively settable to positions related to the value of the withdrawal; said dispensing means releasing the selected withdrawal from storage within the machine for issuance to the exterior of the enclosure whereby the value of the withdrawal is responsive to the setting of said control means; indicia affixing means coacting with said control means for affixing to the document indicia which are indicative of the setting of the control means and hence of the value of the withdrawal; indicia display means coacting with said control means for displaying indicia indicative of the setting of the control means and hence of the indicia affixed to the document; image recording means disposed to view and record an image of said document, of said released withdrawal and of the indicia displayed in identifiable relationship with respect to one another; means moving said document subsequent to an image thereof having been recorded to a storage position from which the document cannot be removed in a surreptitious manner, and further control means interconnected with said sensing means for cyclically operating said document acceptance means, withdrawal dispensing means, image recording means and indicia display means respectively.

12. In a deposit exchange machine including deposit storage means of the type described, the combination of: an enclosure; deposit acceptance means and withdrawal dispensing means contained in the enclosure; said dispensing means including selectively operable release means for dispensing variable withdrawals; said deposit acceptance means including an aperture on said enclosure for receiving a document type deposit; control means disposed to be operable from the exterior of the enclosure and being selectively settable to positions related to the selected withdrawal; said dispensing means releasing the withdrawal from storage within the machine for issuance to the exterior of the enclosure whereby the withdrawal is responsive to the setting of said control means; indicia affixing means coacting with said control means for affixing to the deposit indicia which are indicative of the setting of the control means and hence of the character of the withdrawal; means for transferring said deposit subsequent to the operation of said indicia means to said storage means which are adapted to retain said deposit inaccessible for surreptitious removal therefrom, and further control means for cyclically operating said deposit acceptance means and withdrawal dispensing means.

13. In a deposit exchange machine including deposit storage means of the type described, the combination of: an enclosure; deposit acceptance means and withdrawal dispensing means contained in the enclosure; said dispensing means including selectively operable release means for dispensing variable withdrawals; said deposit acceptance means including an aperture on said enclosure for receiving a document type deposit; document analyzing means adapted to coact with said deposit acceptance means for analyzing said deposit and providing an output which is responsive to data on said deposit; said output coupled to said operable release means for releasing a withdrawal from storage within the machine to the exterior of the enclosure whereby the actuation of the release means is responsive to the specific output from said analyzing means; indicia affixing means disposed in said enclosure for affixing to the deposit indicia which are indicative of the released withdrawal and responsive to the output from the analyzing means; means for transferring said deposit subsequent to the operation of said indicia affixing means to said storage means, and control means for cyclically operating said deposit analyzing means, indicia means and withdrawal dispensing means in response to the acceptance of the deposit.

14. In a deposit exchange machine including deposit storage means of the type described a combination of: an enclosure; deposit acceptance means and withdrawal dispensing means contained in the enclosure; said dispensing means including selectively operable release means for dispensing variable withdrawals; said deposit acceptance means including an aperture on said enclosure for receiving a document type deposit; document analyzing means adapted to coact with said deposit acceptance means for analyzing said deposit and providing an output which is responsive to specific data on said deposit; said output coupled to said selectively operable release means for releasing withdrawals from storage within the machine to the exterior of the enclosure whereby the withdrawal is responsive to the output from said analyzing means and hence responsive to the specific data on said deposit; image recording means disposed to view and record an image of said withdrawal; means for transferring said deposit to said storage means subsequent to the image recording means having recorded an image of said withdrawal, and control means for cyclically operating said deposit analyzing means, withdrawal dispensing means and recording means respectively, in response to the acceptance of the deposit.

References Cited in the file of this patent

UNITED STATES PATENTS

| | | |
|---|---|---|
| 1,952,244 | Grim | Mar. 27, 1934 |
| 2,009,385 | Chiger | July 30, 1935 |
| 2,278,357 | Madden | Mar. 31, 1942 |
| 2,306,518 | Bernart | Dec. 29, 1942 |
| 2,323,255 | Sutherland | June 29, 1943 |
| 2,717,069 | Driscoll | Sept. 6, 1955 |
| 2,923,587 | Zipf | Feb. 2, 1960 |

FOREIGN PATENTS

| | | |
|---|---|---|
| 605,678 | Germany | Nov. 16, 1934 |